United States Patent
Fuhrmann et al.

(10) Patent No.: US 7,215,794 B2
(45) Date of Patent: May 8, 2007

(54) METHOD AND DEVICE FOR READING THE ADDRESSES ON ITEMS OF MAIL

(75) Inventors: Hans Fuhrmann, Constance (DE); Gerhard Funcke, Constance (DE)

(73) Assignee: Siemens AG, München (DE)

( * ) Notice: Subject to any disclaimer, the term of this patent is extended or adjusted under 35 U.S.C. 154(b) by 253 days.

(21) Appl. No.: 10/942,883

(22) Filed: Sep. 17, 2004

(65) Prior Publication Data
US 2005/0031164 A1    Feb. 10, 2005

Related U.S. Application Data

(63) Continuation of application No. PCT/DE03/00771, filed on Nov. 3, 2003.

(30) Foreign Application Priority Data

Mar. 19, 2002 (DE) .............. 102 12 085

(51) Int. Cl.
*C06K 9/00* (2006.01)
*B07C 5/00* (2006.01)
(52) U.S. Cl. .................. 382/101; 209/584
(58) Field of Classification Search ........... 382/101; 209/584
See application file for complete search history.

(56) References Cited

U.S. PATENT DOCUMENTS 4,632,252 A * 12/1986 Haruki et al. ........... 209/546
5,287,271 A * 2/1994 Rosenbaum ............. 705/8
6,351,574 B1   2/2002 Yair et al.
2003/0012407 A1* 1/2003 Rosenbaum et al. ...... 382/101

FOREIGN PATENT DOCUMENTS

DE    1449649        7/1969
DE    19531392 C1    1/1997
DE    10010241 C1    3/2001

OTHER PUBLICATIONS

Abstract—DE-1449649; Jul. 10, 1969; Telefunken Patentverwertungs-GmbH, D-7900 Ulm (Germany).
Derwent-Abstract—DE-19531392C1; Jan. 23, 1997; AEG Electrocom GmbH; D-78467 Konstanz and AB & M GmbH, D-76131 Karlsruhe (Germany).
Derwent-Abstract—DE-10010241C1; Siemens AG, D-80333 München (Germany).
Boris Lohmann, Konstanz; AEG Electrocom, Abteilung PE4, D-78459 Konstanz (Germany)-"Regelungsstruktur für elne Klasse von Förder- und Bearbeitungsprozessen und Anwendungen in der Postautomatisierung"; at Feb. 1996; 44(1996) Feb. No. 2, München.

* cited by examiner

*Primary Examiner*—Bravesh M Mehta
*Assistant Examiner*—Damon Conover

(57) ABSTRACT

The invention relates to the reading of addresses on mailings whereby the images with the addresses are videocoded in several video-coding sites by means of a job distribution device. At fixed intervals a current individual error rate, for first-pass video coding for each video-coded addresses which are not successful on the first pass in the video coding units with the highest current individual error rates, is determined with respect to the total coding error rate to be maintained, by means of the video coding units coming free which have the lowest current individual error rates.

6 Claims, 1 Drawing Sheet

METHOD AND DEVICE FOR READING THE ADDRESSES ON ITEMS OF MAIL

CROSS REFERENCE TO RELATED APPLICATIONS

The present application is a continuation of international patent application PCT/DE03/00771, filed Nov. 3, 2003, which designated the United States, and claims priority to German patent application DE10212085.4, filed Mar. 19, 2002, the both of which are herein incorporated by reference.

BACKGROUND OF THE INVENTION

The present invention relates to a method for reading the addresses on items of mail as claimed in the preamble of claim 1, as well as to a device for carrying out the method as claimed in the preamble of claim 5.

Systems for automatically reading addresses (OCR) are well known in the field of letter processing and are described, for example, in DE 195 31 392 C1. With modern OCR letter sorting systems, processing rates of ten letters per second, i.e. 36,000 letters per hour and more can be achieved. However, the recognition reliability varies greatly depending on the type of lettering and the overall quality of the address information on the surface of the letters. In the case of successful recognition, the respective letter can be provided with a machine-readable barcode. This barcode permits further mechanical processing extending as far as any desired sorting arrangement. In particular, the use of barcodes permits the letters to be sorted extending as far as the sorting level of the postal round during which letters are sorted in accordance with the sequence of their distribution by the postal delivery person.

Since the recognition rates of the automatic reading system vary to a very great extent it is necessary for them to be supported by video coding devices, In this context, the video images of the items of mail which are rejected by the OCR processor are manually coded by video coding personnel at corresponding video coding workstations. In this context, the addresses which are input are converted into a sorting code by means of a directory.

In online video coding systems (OVS) the video image is shown to the operator, while the physical item of mail is held in delaying paths. In these delaying paths, the item of mail is normally kept moving for a time period which is sufficient for the operator to enter the necessary sorting information for the respective image. The customary delaying paths permit a delay between 10 and 30 seconds. The longer the delaying path, the greater the cost and the requirements for maintenance and the physical size of the equipment.

The main problem when using OVS is that the available time is sufficient only to carefully input the zip code (ZIP) or the postcode (PC) unless delaying paths which have an unpractical length are used.

For this reason, special coding methods have been developed for keeping the necessary online delay time as short as possible.

In order to increase the coding productivity and/or to permit all the address elements, i.e. ZIP/PC, road/P.O. Box, addressee/P.O. Box, addressee/company, to be stated, the following essential methods are known:

Preview Coding

In the case of preview coding, the images of two items of mail are represented simultaneously; one above the other. In this context, the lower image is the active one, i.e. its data is coded. After suitable training, it is possible for operators to code the information on the lower image while they are already taking in the address information from the upper image. The upper image then becomes active and the process is continued. With preview coding, it is possible to double operator productivity as a result of a complete overlap of the cognitive and motive functions when coding successive images.

Extraction Coding

Since only the ZIP/PC address elements can be reliably input by the operator given the online delay times which can be achieved in practice, in the case of extraction coding specific key components of parts of the address which relate to the road are input, Extraction coding is usually based on specially developed rules in which a code of a fixed length is used as an access key to an address directory. For example, the Royal Mail uses an extraction formula which is based on the first three and the last two letters In this context, special rules must be committed to memory by the operator in order to avoid excessive address information and to take into account specific differentiating features such as, for example, directions, for example east, west or categories, for example Street, Lane, Road.

Extraction coding has, despite a specific degree of effectiveness, a number of relatively large disadvantages; in particular, complex extraction rules which frequently require the end of a street name to be taken into account, while these components are usually written least clearly. In addition, a significantly high rate of ambiguous extractions take place during which a plurality of entries in one directory correspond to the extraction code so that it is not possible to make an unambiguous sorting decision, Furthermore, it is necessary to take into account the fact that the inputting productivity of the operators is reduced as soon as decisions have to be made by the operator instead of a simple repetitive input on a keyboard.

Offline Coding

Since sufficiently high productivity is not reached in any of the above mentioned coding techniques when pure online coding is used, offline coding systems are also used such as are described in U.S. Pat. No. 4,992,649. In this system, items of mail with addresses which have not been recognized are provided with additional information, a tracking identification (TID). The items of mail which are not recognized are stored externally, while the images of these items of mail are presented to operators for coding, there being no chronological restrictions. The items of mail are then presented to TID reading devices. The TID is logically linked to the input address information. Taking this as a basis, the customary barcode sorting information item can then be applied to the item of mail so that the respective item of mail can be processed as items of mail which have been OCR-read in the customary way. Although the offline video coding method constitutes an effective method of coding all the parts of an address, capacities for the further processing of items of mail which are provided with addresses which are not read, and correspondingly complex logistics, are additionally required.

A sorting system with a plurality of sorters, composed of a sorting section, image recording means and OCR unit, and a plurality of coding stations, has been disclosed in U.S. Pat. No. 4,632,252. The data which has been rejected in the OCR units is assigned to the video coding stations by means of a distributor unit. The data which has been corrected by means of video coding is then sent back via the distributor unit to the sorters from which the rejected data originates.

By including the frequency of the rejected data in each sorter and the performance values features of the video coding stations, the selection of the video coding stations is made in such a way that the throughput rate is as high as possible and the coding stations are utilized to as high a level as possible and as uniformly as possible. By means of this arrangement, in which the individual sorters and the video coding stations are rigidly connected to one another, it is also possible to deal with rejection peaks at a specific sorter.

In order to increase the reading performance it is also known for all the unsuccessfully video coded images, i.e. in which the coding does not correspond to an entry in a corresponding address directory, to be video coded a second time.

This can be carried out by means of the same member of the video coding personnel (said person is given a second chance for correction) or by a different member of the video coding personnel. This image or the reading result is definitively rejected only if this second attempt also fails. A relatively large coding capacity for the second coding process is therefore necessary here, especially since the causes of the failure of correspondence with the entries in the address directories may not only be the coding errors but also errors of the senders or errors in the address directories or address directories which are not up to date.

The statements made with respect to video coding apply of course also to reading devices without an automatic OCR reader.

SUMMARY OF THE INVENTION

The invention specified in claims 1 and 5 is based on the object of increasing the effectiveness of video coding in an address reading system having a plurality of video coding stations, so that the number of images which are to be video coded a second time and which have the address information is reduced in order to comply with defined error rates of the reading system.

This object is achieved in terms of the method by means of the features of claim 1 and in terms of the device by means of the features of claim 5.

The invention is based on the idea that the second video coding is not carried out for all the images or coding results which are rejected during the first video coding but instead only for rejections by specific video coding personnel. Since the quality of the coding by the individual coding personnel is different, a current individual error rate for initial video coding by the individual members of the video coding personnel is determined at defined intervals and is stored in the order distributing device and the second video coding is carried out only for the rejected results of the video coding personnel with the highest current individual error rates, defined in accordance with the overall coding error rate to be maintained, since in this way there is the greatest chance of correcting coding errors and improving the reading performance in an enduring fashion. The second video coding processes have relatively few coding errors because they are carried out by video coding personnel who are free at that particular time and have the lowest current individual error rate.

Advantageous refinements of the invention are illustrated in the subclaims.

It is thus advantageous to search an address directory for verification with the coding result and to classify the coding result as unambiguous if there is an unambiguous assignment to an entry.

It is also advantageous, in order to reduce the deployment of personnel, to feed the stored images of the surfaces of the items of mail having the addresses to at least one OCR unit for automatic reading of the addresses and generation of corresponding address codes and to video code the respective images in the first time only in the event of reading results of the OCR unit or units which are not unambiguous.

In a further advantageous refinement, the number of video coding personnel for whom the images are video coded a second time is selected and defined so that for a predefined error rate of the device for video coding the coding expenditure for the second video coding processes is minimized, or the error rate of the device for video coding is minimized given a defined maximum coding expenditure for the second video coding processes.

BRIEF DESCRIPTION OF THE SEVERAL VIEWS OF THE DRAWINGS

The invention will be presented by way of example below by reference to drawings, in which.

DETAILED DESCRIPTION OF THE INVENTION

Figure 1:
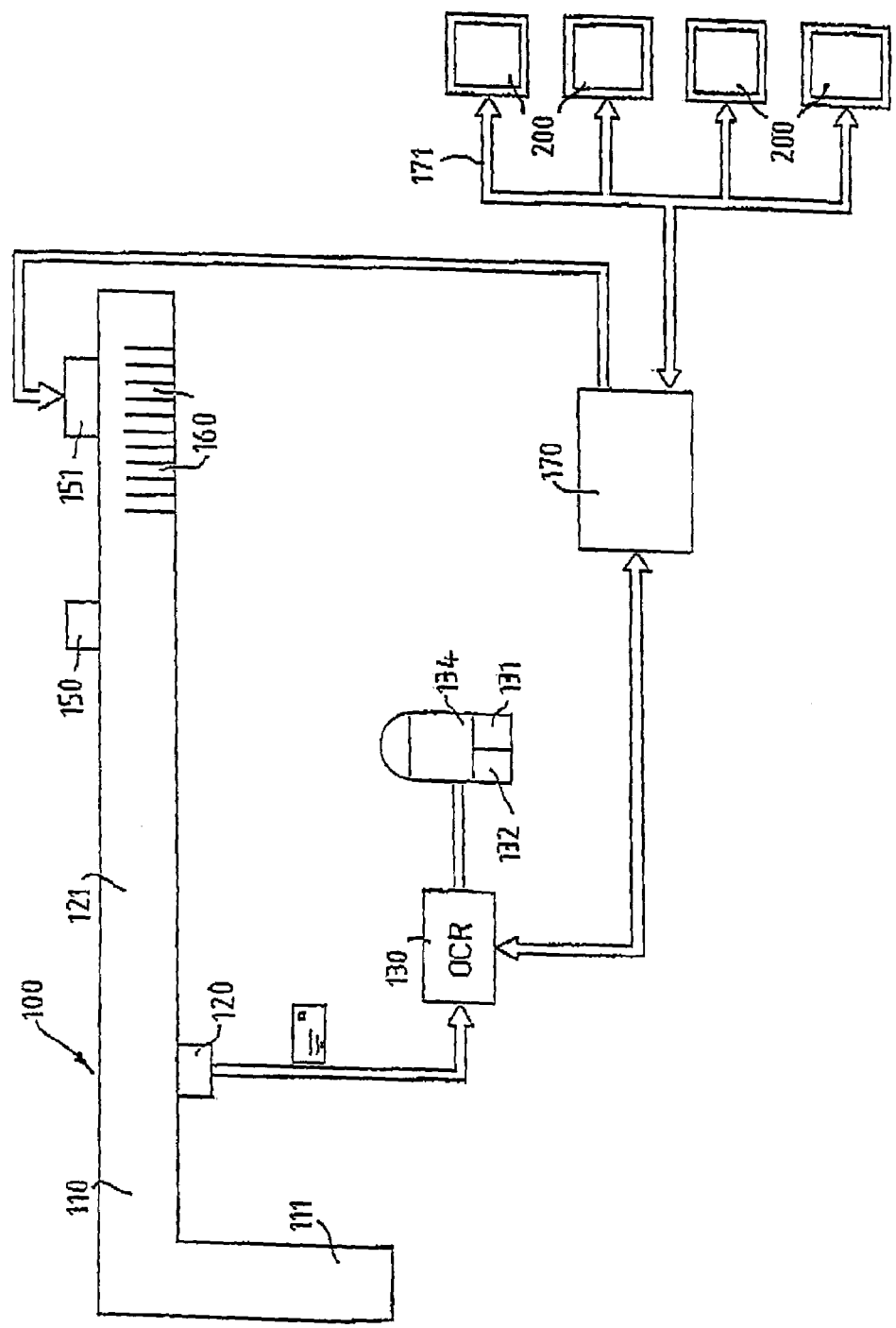
FIG. 1 shows a schematic view of a device for carrying out the method.

FIG. 1 shows a schematic view of a letter distributing system with which the method according to the invention can be carried out. An OCR letter sorter 100 is composed of a feeding device 110 which successively draws off items of mail from a magazine 111 and transports approximately ten items of mail per second to a high-resolution video scanner 120. The items of mail are then transported in a delay path 121. The items of mail usually have address information on their surface. In the OCR processor 130, the address information of the images of the items of mail which have been acquired by the video scanner 120 is evaluated. In the case of complete unambiguous evaluation, a barcode printer 150 is actuated and the item of mail is provided with a corresponding barcode for the subsequent sorting into sorting compartments 160. The OCR processor 130 is composed of one or more microprocessors 131 with associated memory 132 for storing images of the items of mail. Furthermore, the OCR processor 130 contains an address directory 134 with ZIP codes, names of towns and names of streets and possible further information relating to addresses. During the evaluation of images having the address information, a feature-controlled reduction of the entry acquired from the address directory 134 is carried out so that a type of partial directory is generated. Here, credibility values are assigned in individual entries so that during the evaluation a number of data items of correctly recognized addresses are generated. The device also contains an order distributing device 170 and a number of video coding stations 200 which are connected to the order distributing device 170 directly or by means of a local network (LAN) 171. If the OCR evaluation of an image was not successful, this image is transferred from the OCR processor 130 to the order distributing device 170 and stored there in a data bank. The order-distributing device 170, on the one hand, controls the TID barcode printer 151 and on the other transmits the corresponding image to one of the video coding stations 200. The TID barcode printer 151 applies an identification code TID to the corresponding item of mail, which code makes it possible, at a later time, to link the evaluated address information with the physical item of mail. The evaluation of the images is carried out offline in this case although in principle an online evaluation by means of video coding is also possible given a sufficiently long delay time. In the latter case, the TID can also be applied to the items of mail at a later time, i.e. if the video coding has not led to a complete evaluation within a specific predefined time.

After the first video coding process, the respective result is verified using the address directory 134. If no correspondence with an entry is found, a second video coding process is carried out as is also described.

In this example, the order distributing device is connected only to an OCR letter sorter 100 with OCR processor 130. Of course, it is also possible to connect it to a plurality of OCR letter sorters.

If there is no OCR processor present, the images generated in the video scanner 120 are transmitted directly to the order distributing device 170, stored there in the database and distributed to the video coding stations 200. The address directory 134 which is necessary for verification is then a component of the order distributing device 170.

The error rate during the initial video coding is determined for each identified member of the video coding personnel at defined intervals. This is carried out semi-automatically by determining, in a re-coding process for rejected coding processes (unsuccessful verification with reference to the address directory) whether the cause is an input error of the coding personnel or an incorrect address having been written by the sender or an incorrect entry in the address directory. The error rate is then determined statistically over a defined time period (see Table 1) or a defined number of coding processes.

In Table 1, the determination of the individual error rate from the number of the first coding processes in a specific time and the number of input errors is represented for six coding personnel, and the determination of the error rate of the device for video coding with all the video coding stations is represented.

TABLE 1

| Coding personnel Identification | A | B | C | D | E | F | Σ |
|---|---|---|---|---|---|---|---|
| Number of coding processes n = | 100 | 120 | 100 | 80 | 100 | 120 | 620 |
| Number of coding errors f = | 2 | 4 | 12 | 1 | 1 | 8 | 28 |
| Coding error rate KFR [%] = f × 100/n | 2.0 | 3.3 | 12.0 | 1.2 | 1.0 | 6.7 | 4.516 |

It is apparent from this Table 1 that rejected images of the member of the video coding personnel with the identification C should be video coded a second time since the probability of improving the error rate of the overall system during the second video coding of the rejected images by the member of the video coding personnel C is higher than for members of the video coding personnel with a low individual error rate. For the selected member of the video coding personnel C there is a potential, given a second video coding process, to prevent 12 incorrect coding processes. If even more coding errors are to be avoided, the rejected images which originate from the member of the video coding personnel F with the second highest error rate (6.7%) are also video coded a second time i.e. there is then a potential to avoid 20 coding errors for the time period under consideration. For the other video coding personnel A, B, D, E, this functionality is switched off since it is not possible to expect any significant contribution to reducing the overall error rate from this. So that the second video coding processes are subject to as few coding errors as possible, they are carried out by free video coding personnel with the lowest coding error rates, i.e. by the video coding personnel E and D in this case.

If a specific overall coding error rate, for example 2% is to be maintained, the rejected images originating from the video coding personnel C and F are video coded a second time since in this way the required improvement potential is provided with a relative certainty.

This results from the following relationships:

$$\text{SKFR (system error rate)} = (100/\Sigma n) \times (f_A + f_B + f_C + \ldots)$$

A change equation is:

$$d(\text{SKFD})/d(f) = 100/\Sigma n$$

This makes it possible to calculate the number of coding errors which have to be avoided in order to be able to change the system coding error rate SKFD to a specific value.

$$d(f) = d(\text{SKFD}) \times \Sigma n / 100$$

This means in this example:

If the system coding error rate SKFR is to be reduced to a value of 2%, the previous value of 4.516% must be reduced by 2.516%. This results in $$15.6 = 2.516 \times 620/100$$

At least 15.6 coding errors must therefore be avoided and the images of the video coding personnel C and F or C and B must be coded a second time.

The invention claimed is:

1. A method for reading addresses on mail items, comprising the steps of:
    recording images of mail item surfaces, the surfaces including the addresses thereon;
    storing and video coding the images with a plurality of video coding stations, whereto corresponding video coding orders are distributed by an order distributing device, and each member of the video coding personnel enters, at his video coding station, a personal identifier which in each case is signaled to the order distributing device;
    determining a current individual error rate for initial video coding processes for each member of the video coding personnel at defined intervals and stored in the order distributing device, and
    carrying out a second video coding process only for the video coded addresses which were not video coded successfully a first time by video coding personnel with highest current individual error rates, the error rates being defined in accordance with an overall coding error rate to be maintained by video coding personnel who are free at a particular time and have lowest current individual error rates, so that a number of images which are to be video coded a second time is reduced.

2. The method according to claim 1, further comprising the step of searching an address directory with a coding result which is classified as unambiguous if there is an unambiguous assignment to an entry.

3. The method according to claim 1, further comprising the steps of:
- feeding stored images of surfaces of the items of mail which have the addresses to at least one OCR unit for automatic reading of the addresses and generation of corresponding address codes, and
- video coding images of the surfaces a first time only if there are reading results by the OCR unit or units which are not unambiguous.

4. The method according to claim 1, wherein a number of video coding personnel for whom images containing unsuccessfully video coded addresses are video coded a second time is selected and defined so that for a predefined error rate of the device for video coding the coding expenditure for the second video coding processes is minimized, or the error rate of the device for video coding is minimized given a defined maximum coding expenditure for the second video coding processes.

5. An automatic address-reading system comprising:
- a device for acquiring images of items of mail and storing them,
- a device for video coding images including address information, the device for video coding including a plurality of video coding stations,
- an order distributing device arranged to distribute video coding orders to the video coding stations, wherein the order distributing device comprises:
  - means for receiving personal identifiers from video encoder personnel, the identifiers being entered in at least one of the stations and transmitted to the order distribution device;
  - determining a current individual error rate for initial video coding processes for each of the personnel at defined intervals; and
  - storing each of the error rates in the order distributing device, and
  - means for carrying out a second video coding process only for video coded addresses which were not video coded successfully a first time by video coding personnel with highest current individual error rates, defined in accordance with overall coding error rate to be maintained by video coding personnel who are free at that particular time and have lowest current individual error rates, so that a number of images which are to be video coded a second time is reduced.

6. The device according to claim 5, further comprising an OCR processor for automatically reading addresses, the processor being connected to the device and order distribution device and arranged to acquire images of items of mail and storing them.

* * * * *

UNITED STATES PATENT AND TRADEMARK OFFICE
CERTIFICATE OF CORRECTION

| | | |
|---|---|---|
| PATENT NO. | : 7,215,794 B2 | Page 1 of 1 |
| APPLICATION NO. | : 10/942883 | |
| DATED | : May 8, 2007 | |
| INVENTOR(S) | : Hans Fuhrmann and Gerhard Funcke | |

It is certified that error appears in the above-identified patent and that said Letters Patent is hereby corrected as shown below:

Title Page item 63

Please change the "Related U.S. Application Data" from:

"Continuation of application No. PCT/DE03/00771, filed on Nov. 3, 2003"

to

-- Continuation of application No. PCT/DE03/00771, filed on March 11, 2003 --

In accordance with the Corrected Filing Receipt, mailed Feb. 26, 2007, and the Declaration. The original Filing Receipt, mailed Nov. 4, 2004, identifies the parent filing date as 11/03/2003.

Signed and Sealed this

Sixth Day of May, 2008

JON W. DUDAS
*Director of the United States Patent and Trademark Office*